(12) United States Patent
Macchia

(10) Patent No.: US 8,278,774 B2
(45) Date of Patent: Oct. 2, 2012

(54) GAS TURBINE WITH WIRED SHAFT FORMING PART OF A GENERATOR/MOTOR ASSEMBLY

(75) Inventor: Enzo Macchia, Kleinburg (CA)

(73) Assignee: Pratt & Whitney Canada Corp., Longueuil (CA)

( * ) Notice: Subject to any disclaimer, the term of this patent is extended or adjusted under 35 U.S.C. 154(b) by 538 days.

(21) Appl. No.: 12/493,841

(22) Filed: Jun. 29, 2009

(65) Prior Publication Data

US 2010/0327589 A1    Dec. 30, 2010

(51) Int. Cl.
| | |
|---|---|
| *F01D 15/10* | (2006.01) |
| *F02C 6/00* | (2006.01) |
| *H02K 7/18* | (2006.01) |
| *H02P 9/04* | (2006.01) |
| *F03H 1/00* | (2006.01) |
| *F02K 3/02* | (2006.01) |

(52) U.S. Cl. .......... 290/52; 60/203.1; 60/226.1; 60/773; 310/154.01

(58) Field of Classification Search ............... 290/52; 60/203.1, 226.1, 773; 310/154.01
See application file for complete search history.

(56) References Cited

U.S. PATENT DOCUMENTS

| | | | |
|---|---|---|---|
| 3,558,941 A * | 1/1971 | Visconti Brebbia et al. ................ | 310/49.15 |
| 3,842,300 A * | 10/1974 | Daykin et al. ......... | 310/216.004 |
| 4,806,841 A * | 2/1989 | Lee et al. ............... | 322/29 |
| 4,827,712 A | 5/1989 | Coplin ................... | 60/226.1 |
| 5,861,694 A * | 1/1999 | Niemela ................ | 310/89 |
| 5,867,979 A * | 2/1999 | Newton et al. ........ | 60/226.1 |
| 6,028,378 A * | 2/2000 | Lack et al. ............ | 310/51 |
| 6,357,220 B1 * | 3/2002 | Snyder et al. ......... | 60/796 |
| 6,459,180 B1 | 10/2002 | Mori et al. ............ | 310/61 |
| 6,469,725 B1 * | 10/2002 | Nagahata .............. | 347/209 |
| 6,522,041 B1 * | 2/2003 | Verbrugge et al. ... | 310/154.01 |
| 6,657,337 B1 * | 12/2003 | Delevallee ............ | 310/89 |
| 6,692,222 B2 | 2/2004 | Prinz et al. ........... | 415/14 |
| 6,700,269 B2 * | 3/2004 | Torii et al. ............ | 310/154.08 |
| 6,703,753 B1 * | 3/2004 | Fujinaka ............... | 310/216.071 |
| 6,710,493 B2 * | 3/2004 | Yoshikawa et al. .. | 310/154.08 |
| 6,774,515 B2 | 8/2004 | Mori et al. ............ | 310/61 |
| 6,806,607 B2 * | 10/2004 | Lau ...................... | 310/154.01 |
| 6,838,799 B1 * | 1/2005 | Caiozza ................ | 310/190 |
| 6,867,523 B2 * | 3/2005 | Higuchi ................ | 310/154.15 |
| 6,891,296 B1 * | 5/2005 | Huang et al. ......... | 310/156.01 |
| 6,895,741 B2 | 5/2005 | Rago et al. ........... | 60/226.1 |
| 6,914,344 B2 | 7/2005 | Franchet et al. ..... | 290/52 |
| 6,965,183 B2 * | 11/2005 | Dooley ................. | 310/201 |
| 7,059,136 B2 * | 6/2006 | Coffinberry .......... | 60/785 |
| 7,107,756 B2 * | 9/2006 | Rolt ...................... | 60/224 |
| 7,159,295 B2 * | 1/2007 | Lau ...................... | 29/596 |
| 7,208,854 B1 * | 4/2007 | Saban et al. .......... | 310/61 |
| 7,224,082 B2 | 5/2007 | Bouiller et al. ....... | 290/52 |
| 7,368,843 B2 * | 5/2008 | Yokota et al. ........ | 310/216.067 |

(Continued)

FOREIGN PATENT DOCUMENTS

GB    1147730    4/1969

(Continued)

*Primary Examiner* — Pedro J Cuevas

(74) *Attorney, Agent, or Firm* — Norton Rose Canada LLP

(57) ABSTRACT

A gas turbine engine including an electrical assembly operable as at least one of an electric motor and a generator, with an electromagnetic rotor formed in part by a portion of one of a main shaft concentrically and drivingly connected to at least one turbine rotor and a tower shaft directly driven by the main shaft and extending generally radially therefrom.

16 Claims, 8 Drawing Sheets

U.S. PATENT DOCUMENTS

| | | | |
|---|---|---|---|
| 7,375,447 B2* | 5/2008 | Oomori et al. | 310/88 |
| 7,498,706 B2* | 3/2009 | Kuroda | 310/154.01 |
| 7,514,806 B2* | 4/2009 | Xu et al. | 290/31 |
| 7,579,745 B2* | 8/2009 | Yamada et al. | 310/269 |
| 7,638,914 B2* | 12/2009 | Miekka | 310/154.01 |
| 7,732,962 B2* | 6/2010 | Kuroda | 310/154.01 |
| 7,732,963 B2* | 6/2010 | Iizuka et al. | 310/154.21 |
| 8,097,972 B2* | 1/2012 | Macchia | 290/52 |
| 8,146,369 B2* | 4/2012 | Walitzki et al. | 60/786 |
| 2002/0047381 A1* | 4/2002 | Torii et al. | 310/89 |
| 2002/0096957 A1* | 7/2002 | Wei | 310/180 |
| 2002/0104316 A1* | 8/2002 | Dickey et al. | 60/772 |
| 2005/0193738 A1* | 9/2005 | Hayasaka et al. | 60/726 |
| 2007/0101696 A1 | 5/2007 | Dooley | 60/203.1 |
| 2007/0245709 A1 | 10/2007 | Dooley | 60/226.1 |
| 2007/0246302 A1* | 10/2007 | Bell et al. | 184/6.11 |
| 2007/0289310 A1 | 12/2007 | Dooley et al. | 60/773 |
| 2008/0001492 A1* | 1/2008 | Cros et al. | 310/233 |
| 2008/0024026 A1* | 1/2008 | Aoyama et al. | 310/154.01 |
| 2008/0072567 A1* | 3/2008 | Moniz et al. | 60/226.1 |
| 2008/0075590 A1* | 3/2008 | Moniz et al. | 415/229 |
| 2008/0150287 A1* | 6/2008 | Kern et al. | 290/52 |
| 2008/0197740 A1* | 8/2008 | Hughes | 310/184 |
| 2008/0278014 A1* | 11/2008 | Chen | 310/114 |
| 2008/0303280 A1* | 12/2008 | Xu et al. | 290/31 |
| 2009/0045687 A1* | 2/2009 | Yu et al. | 310/154.01 |
| 2010/0013361 A1* | 1/2010 | Zhao et al. | 310/40 MM |
| 2010/0327588 A1* | 12/2010 | Macchia | 290/52 |
| 2011/0116955 A1* | 5/2011 | Naito et al. | 417/423.7 |
| 2012/0062161 A1* | 3/2012 | Patel et al. | 318/400.33 |

FOREIGN PATENT DOCUMENTS

| | | |
|---|---|---|
| JP | 06153476 | 5/1994 |
| RU | 2244159 | 1/2005 |
| WO | 2005111381 | 11/2005 |

* cited by examiner

GAS TURBINE WITH WIRED SHAFT FORMING PART OF A GENERATOR/MOTOR ASSEMBLY

TECHNICAL FIELD

The application relates generally to gas turbine engines, more particularly to electrical generator and motor assemblies for such gas turbine engines.

BACKGROUND OF THE ART

In gas turbine engines, it is generally known to connect a generator to a rotating shaft through an accessory gear box, in order to generate electricity used for powering accessory electrical components of the engine and/or the aircraft. The accessory gear box in turn is used to drive accessories of the gas turbine engine. The presence of the accessory gear box usually increases the overall complexity, weight and cost of the engine.

Accordingly, there is a need to provide an improved electrical generator for a gas turbine engine.

SUMMARY

In one aspect, there is provided a gas turbine engine having a compressor section and a turbine section, comprising a first shaft being one of a main shaft concentrically mounted to at least one turbine rotor of the turbine section and a tower shaft directly driven by the main shaft and extending generally radially therefrom, an electrical assembly having a rotor including a support portion directly secured to the first shaft, the rotor of the electrical assembly including a magnetic field circuit retained on the support portion, the electrical assembly also including a stator having permanent magnets disposed adjacent an outer periphery of the magnetic field circuit; and an electrical connection between the magnetic field circuit and at least one of a power source and an electrically drivable accessory.

In another aspect, there is provided a gas turbine engine comprising a first shaft being one of a main shaft concentrically and drivingly connected to at least one turbine rotor and a tower shaft directly driven by the main shaft and extending generally radially therefrom, and an electrical assembly operable as at least one of an electric motor and a generator, the electrical assembly including an electromagnetic rotor, the electromagnetic rotor being formed in part by a portion of the first shaft.

DESCRIPTION OF THE DRAWINGS

Reference is now made to the accompanying figures, in which.

DETAILED DESCRIPTION

Figure 1:
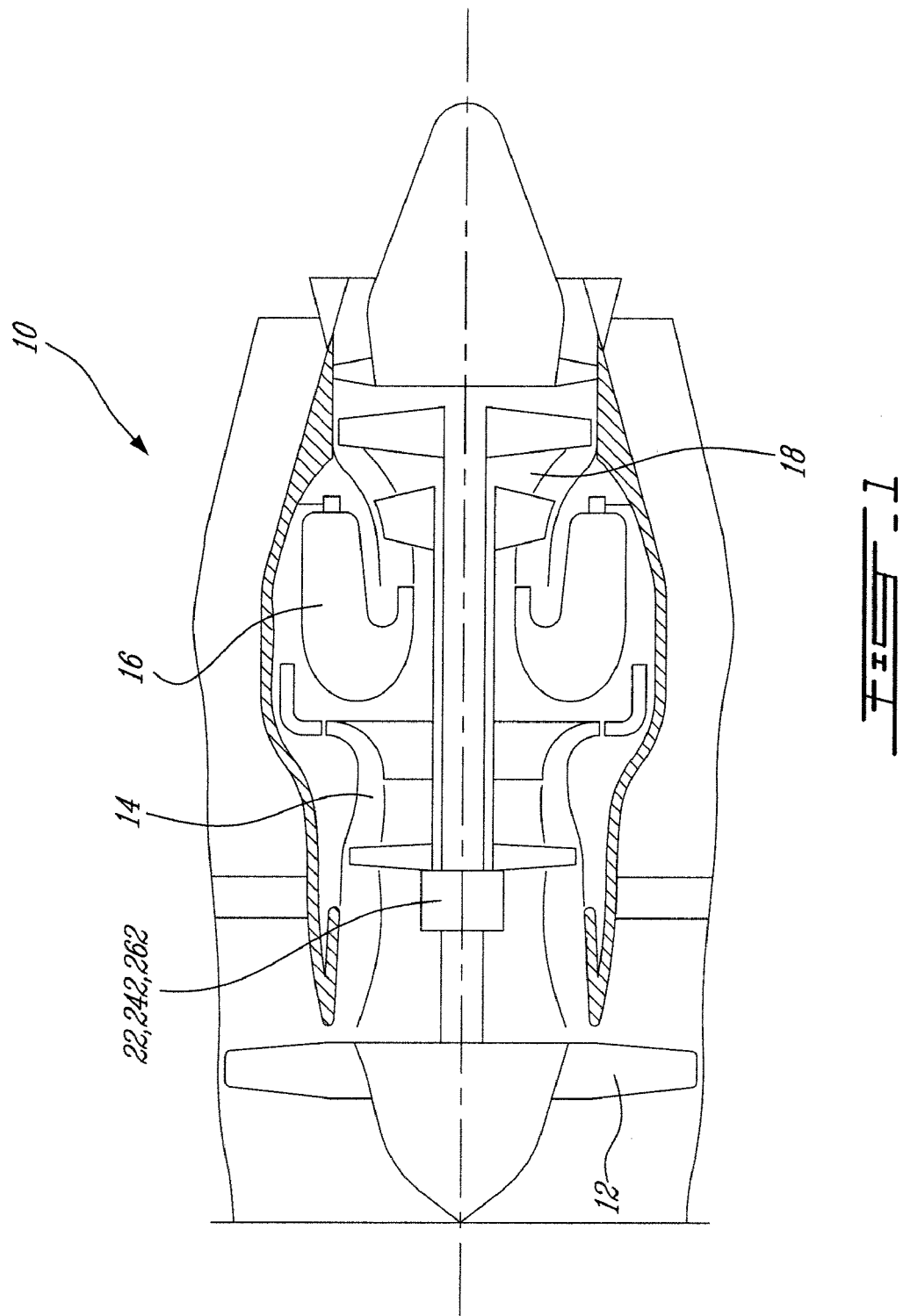
FIG. 1 is a schematic cross-sectional view of a gas turbine engine.

FIG. 1 illustrates a gas turbine engine 10 of a type preferably provided for use in subsonic flight, generally comprising in serial flow communication a fan 12 through which ambient air is propelled, a multistage compressor 14 for pressurizing the air, a combustor 16 in which the compressed air is mixed with fuel and ignited for generating an annular stream of hot combustion gases, and a turbine section 18 for extracting energy from the combustion gases.

Figure 2:
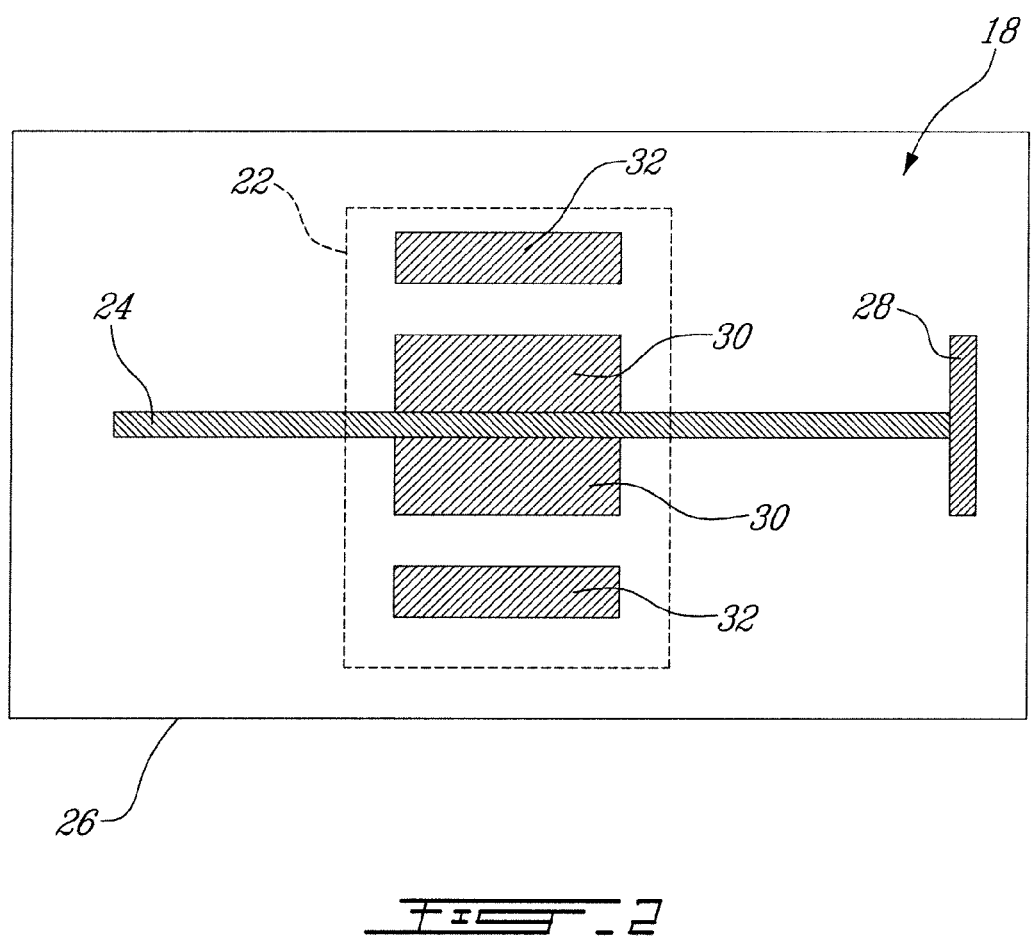
FIG. 2 is a schematic cross-sectional view of a gas turbine engine such as shown in FIG. 1 provided with a generator/motor electrical assembly mounted on a shaft thereof, in accordance with an embodiment.

FIG. 2 schematically illustrates one embodiment of a generator/motor electrical assembly 22 mounted to a main shaft 24 of a gas turbine engine such as shown in FIG. 1. The main shaft 24 is rotationally attached to a casing 26 of the engine via bearings and concentrically mounted to a turbine rotor 28 of the turbine section 18 so that a rotation of the turbine rotor 28 induces a rotation of the shaft 24. The electrical assembly 22 comprises a rotor 30 and a stator 32. The rotor 30 is formed in part by a portion of the main shaft 24 and comprises at least one electromagnet fixedly secured to the shaft 24. The stator 32 comprises at least two permanent magnets fixedly secured to the casing 26. The permanent magnets are circumferentially disposed about the outer periphery of the rotor 30. The permanent magnets are adjacent to the electromagnet of the rotor 30 so that the magnetic field generated by the permanent magnets can interact with the electromagnet. The rotor 30 acts as a magnetic field circuit for either generating an electrical current or rotating the shaft 24.

In one embodiment, the electrical assembly 22 is used as an electricity generator. The rotation of the turbine rotor 28 drives the shaft 24. As a result, the electromagnet of the rotor 30 is rotated between the permanent magnets of the stator and an electrical current is induced in the rotor. A commutator (not shown) periodically reverses the electromagnet connections to the external circuit in order to produce a unidirectional current in the magnetic field circuit. An external circuit receiving the current comprises the accessory equipments powered by the electrical assembly 22.

The electrical assembly 22 may also be used as a motor to act as a starter for starting the rotation of the turbine rotor 28. In this case, the magnetic field circuit 30 is powered by a source of electrical current via a commutator (not shown). The commutator periodically reverses the current direction in the magnetic field circuit 30. By reversing the current direction in the electromagnet of the magnetic field circuit 30, a steady rotating force, i.e. a torque, is produced. The torque drives the shaft which induces the rotation of the turbine rotor. Once the gas turbine is started, the turbine drives the rotor 30 as mentioned above.

While in the embodiment illustrated in FIG. 2, the rotor 30 comprises two electromagnets secured on the outer circumferential surface of the shaft 24, it should be understood that any adequate number of electromagnets can be used. Similarly, while FIG. 2 illustrates an engine 20 comprising two permanent magnets, it should be understood that the stator can comprise more than two permanent magnets. For example, the rotor can comprise four electromagnets and the stator can comprise four permanent magnets.

Figure 3:
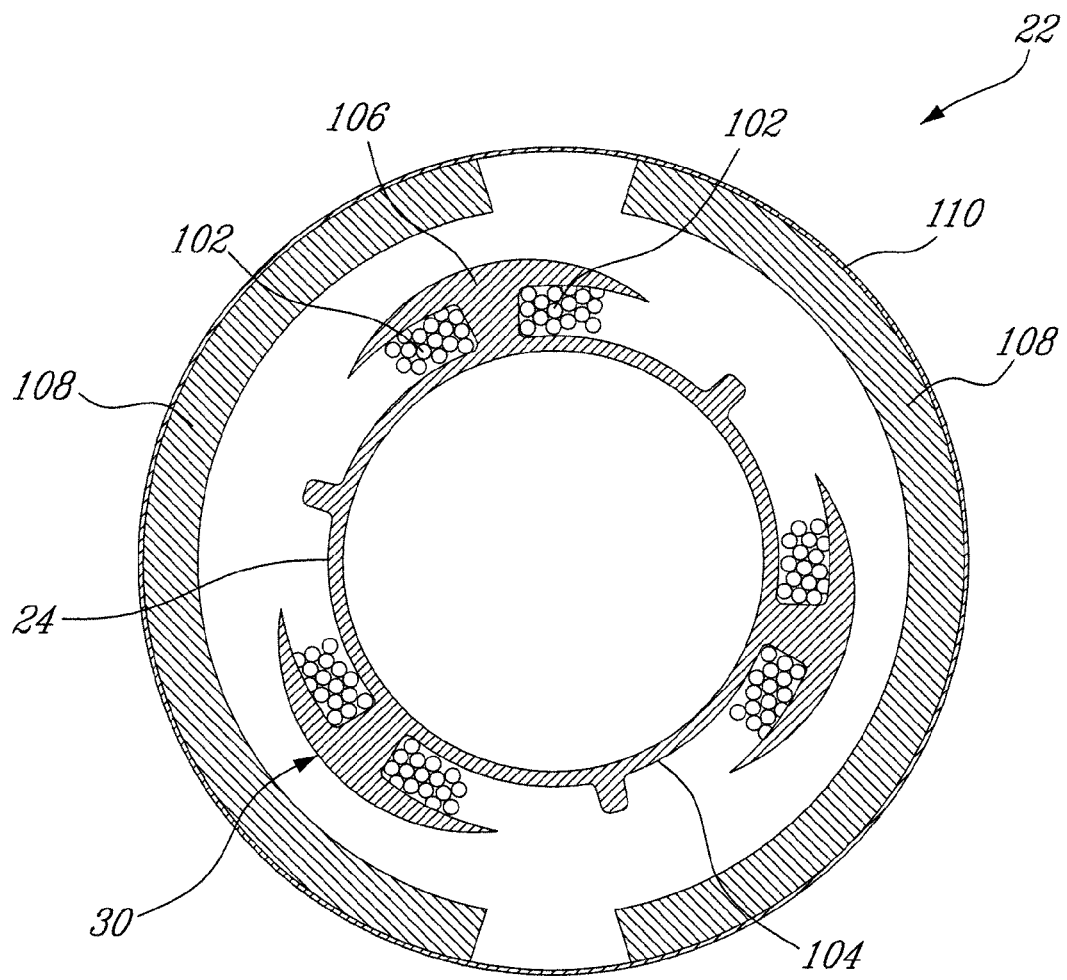
FIG. 3 is a cross-sectional view of an exemplary embodiment of the electrical assembly of FIG. 2.

It should be understood that any adequate type of electromagnet can be used for the rotor 30 of the electrical assembly 22. FIG. 3 illustrates an exemplary embodiment for the generator/motor electrical assembly 22 where the rotor 30 is provided with three coils of conductive wires 102. Materials suitable for the conductive wires 102 include, but are not limited to, copper wire and nano-carbon tubes. The rotor 30 is formed in part by the shaft 24, which in a particular embodiment is a high pressure shaft, and as such is fixedly secured thereto. A portion of the shaft 24 defines a support portion including radially extending salient or T-shaped supports 106. In the embodiment shown, the supports 106 are integral with a remainder of the shaft 24. In an alternate embodiment, the supports 106 radially extend from the outer circumferential surface 104 of the remainder of the shaft 24. Each wire 102 is wound around a corresponding T-shaped support 106 to form a coil. The stator 32 includes two arcuate permanent magnets 108 which surround the rotor 30 and a protective cylinder 110 which maintains the permanent magnets 108 into position.

In an alternate embodiment, the electrical assembly has a tubular configuration, wherein a tubular sheath is concentric with and surrounds the rotor thereby circumferentially joining the radially projecting supports. The tubular sheath surrounding the rotor, and therefore within the outer permanent magnets, may also be provided with an optional insulating sheet. The tubular sheath accordingly defines arcuate channels circumferentially spaced apart between each of the windings (and therefore between the electromagnetic poles) and within which an insulating material may be provided. If required, metal dividers may be used to separate the insulating material and the conductive wires of the windings. Additionally, struts within shaft itself in circumferential alignment with the radially extending portions of the outer winding supports may also be provided. Additional conductive wires of each winding may thus be provided along and about each of the internal struts within the shaft. It is of note that the wiring of the windings can be random or orderly, depending on the particular application.

While the embodiment illustrated in FIG. 3 comprises three coils, it should be understood that the rotor 30 can comprise any number of coils greater than or equal to one.

In one embodiment, the protective cylinder 110 is made of a thermally insulating material in order to thermally protect the electrical assembly enclosed therein. In the same or alternate embodiment, the protective cylinder 108 is made of electrically insulating material in order to protect the electrical assembly from exterior electromagnetic fields.

Figure 4:
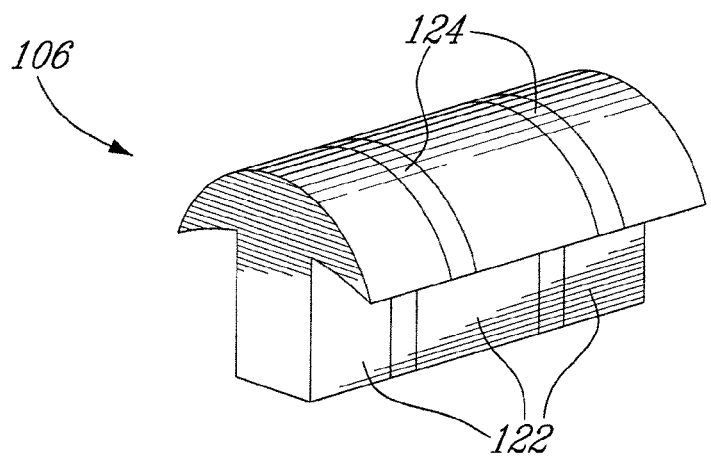
FIG. 4 is perspective view of an exemplary embodiment of a T-shaped coil support of the electrical assembly of FIG. 3.

FIG. 4 illustrates an exemplary embodiment of the laminate T-shaped support 106 which is preferably adapted to reduce Foucault or Eddy currents. The laminate T-shaped support 106 comprises metallic T-shaped strips 122 and electrically insulating T-shaped strips 124 which are interconnected. The electrically insulating T-shaped strips 124 are made of any adequate type of electrically insulating material such as, but not limited to, an adequate insulating adhesive, polyethylene, polyvinyl chloride, rubber-like polymer, Teflon™, and the like. The T-shaped support thus includes the metallic strips 122 which alternate with the electrically insulating strips 124. In an alternate embodiment which is not shown, the T-shaped support 106 is entirely made of an adequate type of rigid electrically insulating material.

In a particular embodiment, the strips 122, 124 are interconnected through an adequate type of adhesive with an adequate application of pressure or through any adequate type of mechanical fastener, and the assembly is pressure fitted around the remainder of the shaft and welded thereto, for example through electron beam welding.

In a particular embodiment, the supports 106 are integral with the remainder of the shaft and integrally machined therein, and slots are machined in the supports 106 to form the metallic strips 122, for example through electrical machining, such that the insulating strips 124 can be inserted therein.

While the present description refers to coils having a T-shaped support around which an electrical conductive wire is wound, it should be understood that any coil adapted to generate an electromagnetic field can be used. For example, the coil can comprise a tubular support extending from the outer surface of the shaft around which a conductive wire is wound.

Figure 5:
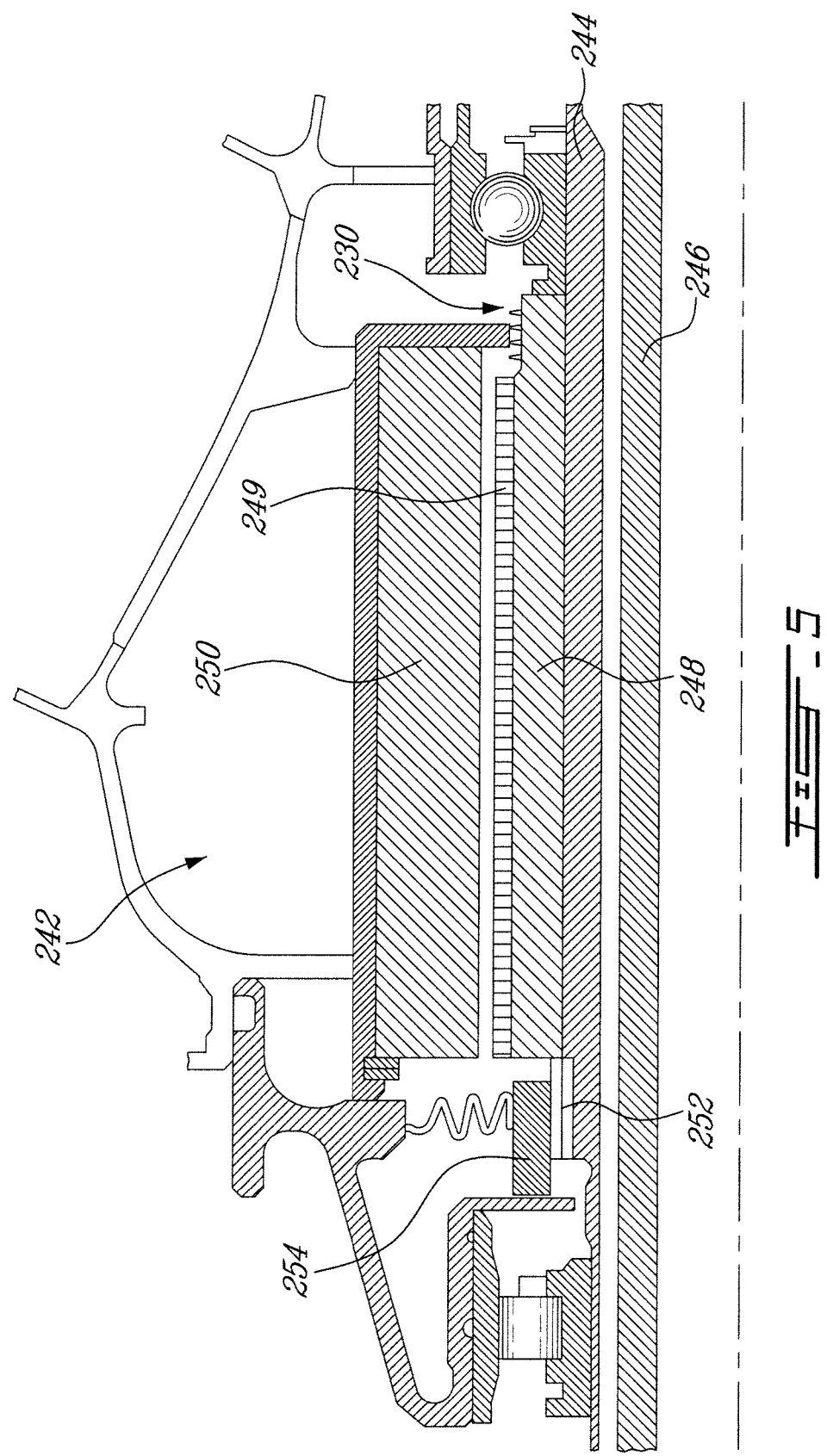
FIG. 5 is a schematic cross-sectional partial view of a gas turbine engine showing an embodiment of the generator/motor electrical assembly including a support mounted to the outer circumferential surface of a remainder of the high pressure shaft.

FIG. 5 illustrates a particular embodiment of a generator/motor electrical assembly 242 located around the outer circumferential surface of a main shaft, more particularly the high pressure shaft 244 of a gas turbine engine such as shown in FIG. 1. The high pressure shaft 244 is in the form of a hollow cylinder and is drivingly connected to a high pressure turbine rotor (not shown). The engine also comprises a low pressure shaft 246 disposed within the high pressure shaft 244 and drivingly connected to a low pressure turbine rotor (not shown). Both the high pressure shaft 244 and the low pressure shaft 246 are secured to the casing of the engine via bearings and are rotationally independent from one another.

The electrical assembly 242 comprises a rotor 230 formed in part by the high pressure shaft 244, and as such is fixedly secured thereto. A portion of the high pressure shaft 244 defines a support portion 248 which receives at least one electromagnet 249. In a particular embodiment, the support portion 248 is integral with a remainder of the high pressure shaft 244. In the embodiment shown, the support portion 248 is fixedly secured to the outer circumferential surface of the remainder of the high pressure shaft 244. In a particular embodiment, the rotor 230 is configured as the rotor 30 shown in FIG. 3, although a number of alternate configurations are also possible.

The electrical assembly 242 also includes a stator 250 fixedly secured to the casing of the engine and including permanent magnets. The permanent magnets are positioned in the outer periphery of the rotor 248 so that the permanent magnets and the electromagnet interact together. A commutator 252 is also secured to the outer surface of the high pressure shaft 244. Two or more spring loaded brushes 254 are provided in order to connect the electromagnet of the rotor 248 to a power source and/or accessory equipments to be powered. The brushes 254 are positioned to be in contact with the commutator 252. In a particular embodiment, the electrical assembly 242 is used as a generator and the brushes are electrically connected to the accessory equipments to be powered by the generator. In another embodiment, the electrical assembly 242 is used as a starter and the brushes 252 are electrically connected to a power source in order to apply a current to the rotor 248 of the electrical assembly 242 and rotate the turbine rotor via the high pressure shaft 244. In a further embodiment, the brushes are connected to both a power source and accessory equipment in an alternate manner and the electrical assembly 242 is selectively used as both a generator and a starter.

In the embodiment shown, the electrical assembly 242 is located in the core of the compressor section 14 forward of the high pressure compressor near the end of the high pressure shaft 244, as indicated schematically in FIG. 1.

Figure 6:
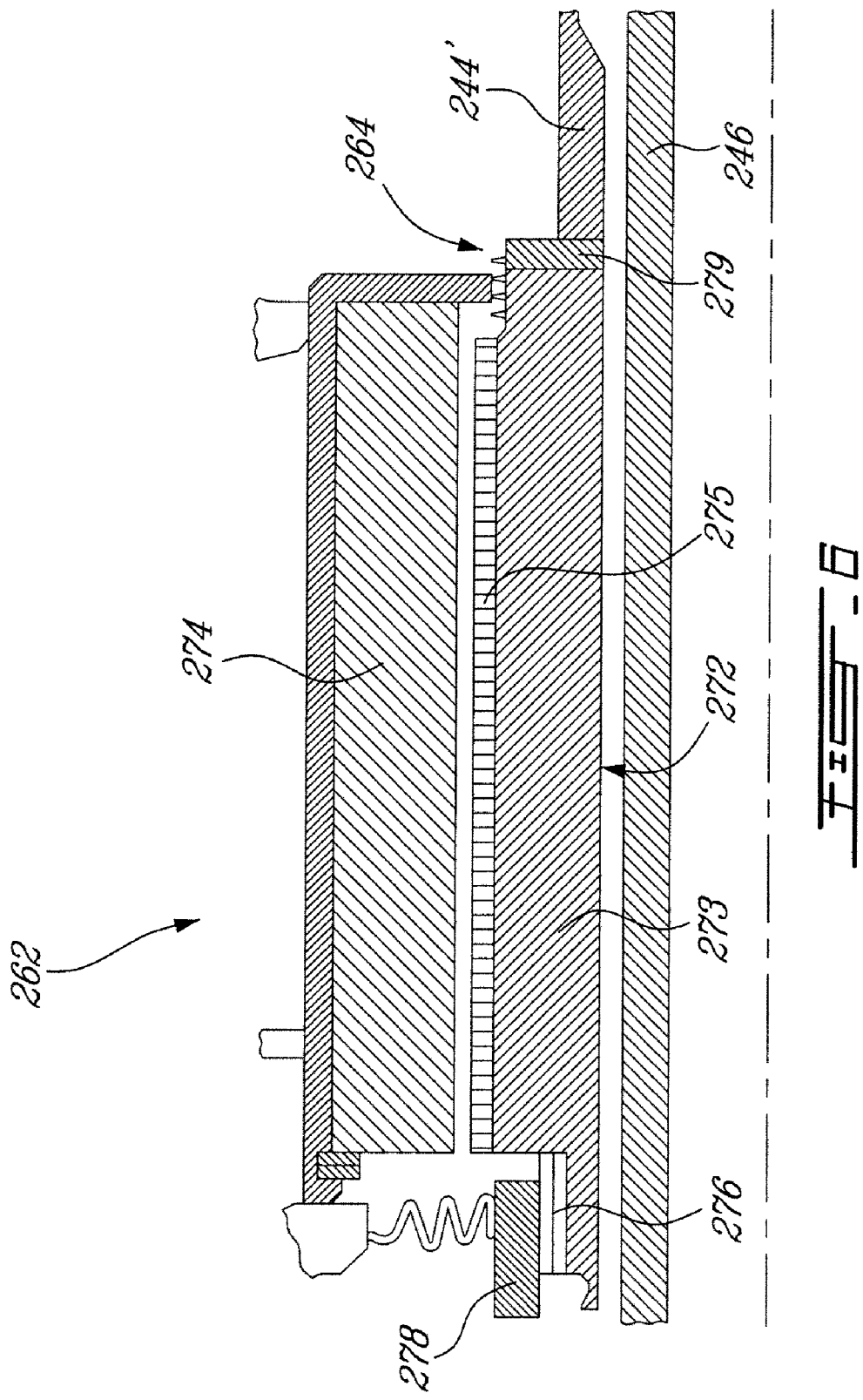
FIG. 6 is a schematic cross-sectional partial view of a gas turbine engine showing an alternate embodiment of the electrical assembly including a support mounted to an end of a remainder of the high pressure shaft.

FIG. 6 illustrates an alternate embodiment of a generator/motor electrical assembly 262 located at an end 264 of a high pressure shaft 244' of a gas turbine engine such as shown in FIG. 1. The electrical assembly 262 comprises a rotor 272 which is formed in part by the high pressure shaft 244' and as such is fixedly secured thereto. A portion of the high pressure shaft 244' defines a support portion 273 which receives at least one electromagnet 275. In the embodiment shown, the support portion 273 is fixedly secured to an end surface 264 of the remainder of the high pressure shaft 244'. In a particular embodiment, the rotor 272 is configured as the rotor 30 shown in FIG. 3, although a number of alternate configurations are also possible.

The electrical assembly 262 also includes a stator 274 and a commutator 276. The commutator 276 is fixedly secured to the rotor 272. Spring loaded brushes 278 are used to connect the rotor 272 to at least one of a power source and/or at least one electrical equipment to be powered.

In one embodiment, an electrically insulating plate 279 is inserted between the rotor 272 and the shaft 244' in order to reduce/cancel Foucault or Eddy currents. An additional electrically insulating plate (not shown) can also be inserted between the electromagnets 275 of the rotor 272 and the commutator 276. It should be understood that the electrically insulating plate can be made of any adequate type of electrically insulating material such as, but not limited to, polyethylene, polyvinyl chloride, rubber-like polymer, Teflon™, and the like.

While in the embodiment illustrated in FIG. 6, the commutator 276 is located at an extremity of the assembly, in an alternate embodiment which is not shown, the commutator 276 is located between the rotor 272 and the high pressure shaft 244'. In this case, the commutator 276 is fixedly secured to the end surface 264 of the high pressure shaft 66 and the rotor 272 is secured to the commutator 276.

It should be understood that the rotor of the generator/motor electrical assembly 22, 242, 262 can be attached to or integral with any adequate rotating shaft present in a turbine engine. In one particular embodiment which is not shown, the rotor is secured to the low pressure shaft.

Figure 7:
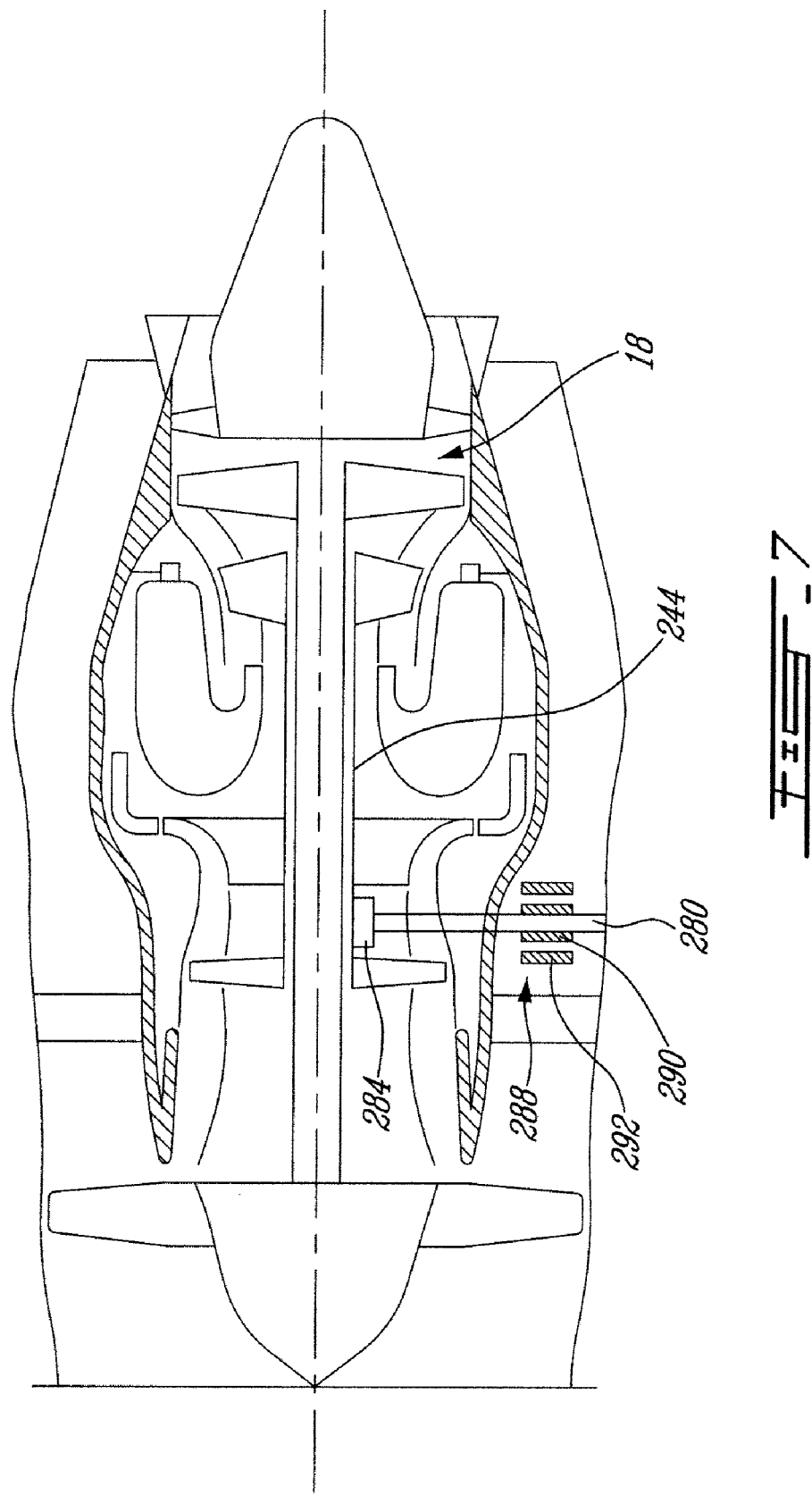
FIG. 7 is a schematic cross-sectional partial view of a gas turbine engine showing an alternate embodiment of the electrical assembly mounted to a tower shaft.

In another example illustrated in FIG. 7, the generator/motor electrical assembly is associated with an accessory or tower shaft. In this embodiment, a tower shaft 280 is drivingly connected to the main shaft, for example the high pressure shaft 244, via a gear interface 284. The tower shaft 280 is directly driven by the main shaft and extends generally radially therefrom. Although the tower shaft 280 is shown here as extending perpendicularly to the high pressure shaft 244, "generally radially" is intended to include other angular orientations which are alternately possible. The high pressure shaft 244 is drivingly connected to a turbine rotor of the turbine section 18. In a particular embodiment, the gear interface 284 has a 1:1 ratio, such that the main shaft and tower shaft 280 rotate at a same speed. In an alternate embodiment, the gear interface 284 has a ratio different than 1:1, such as to form a "mini" gear reduction assembly therebetween.

A generator/motor electrical assembly 288 is associated with the tower shaft 280 in order to generate electricity and/or start the turbine rotor. The tower shaft 280 and the electrical assembly 288 are located in a main strut of the gas turbine engine. The electrical assembly 288 comprises a rotor 290 formed in part by a support portion of the tower shaft 280 which is fixedly secured to a circumferential surface or an end surface of a remainder of the tower shaft or integral with the remainder of the tower shaft 280. The rotor 290 comprises at least one electromagnet circumferentially secured to the support portion of the tower shaft 280. The electrical assembly 288 also comprises a stator 292 including permanent magnets positioned in the outer periphery of the rotor 290 so that their electromagnetic fields interact together, and a commutator and brushes (not shown).

In one embodiment, the electrical assembly 288 is located in a strut ventilated by bypass air. In this case, the electrical assembly is cooled by the bypass air.

While FIG. 3 illustrates a rotor including coils comprising wires 102 winded up around T-shaped supports 106, it should be understood that any adequate configuration can be used for the rotor of the electrical assemblies 22, 242, 262, 288 described above. In a particular embodiment shown in FIG. 8, a rotor includes a support portion 300 defined integrally with an outer circumferential portion of the shaft (e.g. high pressure shaft 244, 244', tower shaft 280) and is provided with twelve regularly circumferentially spaced apart longitudinal recesses 302 extending along at least a portion of the shaft length and defined in an outer surface thereof. A pair of conductive wires 304A,B . . . L is embedded in each recess 302. The wires 304A,B . . . L are electrically interconnected to form an electromagnet. FIG. 9 illustrates an embodiment of electrical connections between the wires 304A,B . . . L and with a commutator 303 and brushes 305 located at the front thereof such as to form two poles when current is circulated through the wires 304A,B . . . L.

Figure 8:
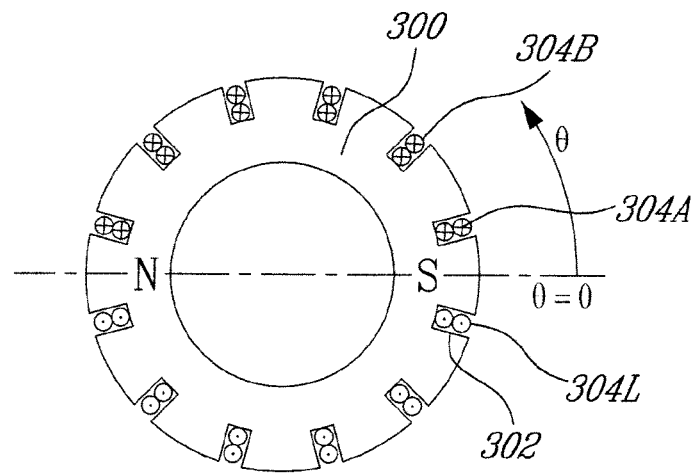
FIG. 8 is a schematic cross-sectional view of a rotor of the electrical assembly comprising wires embedded in recesses of the shaft, in accordance with an alternate embodiment.
Figure 9:
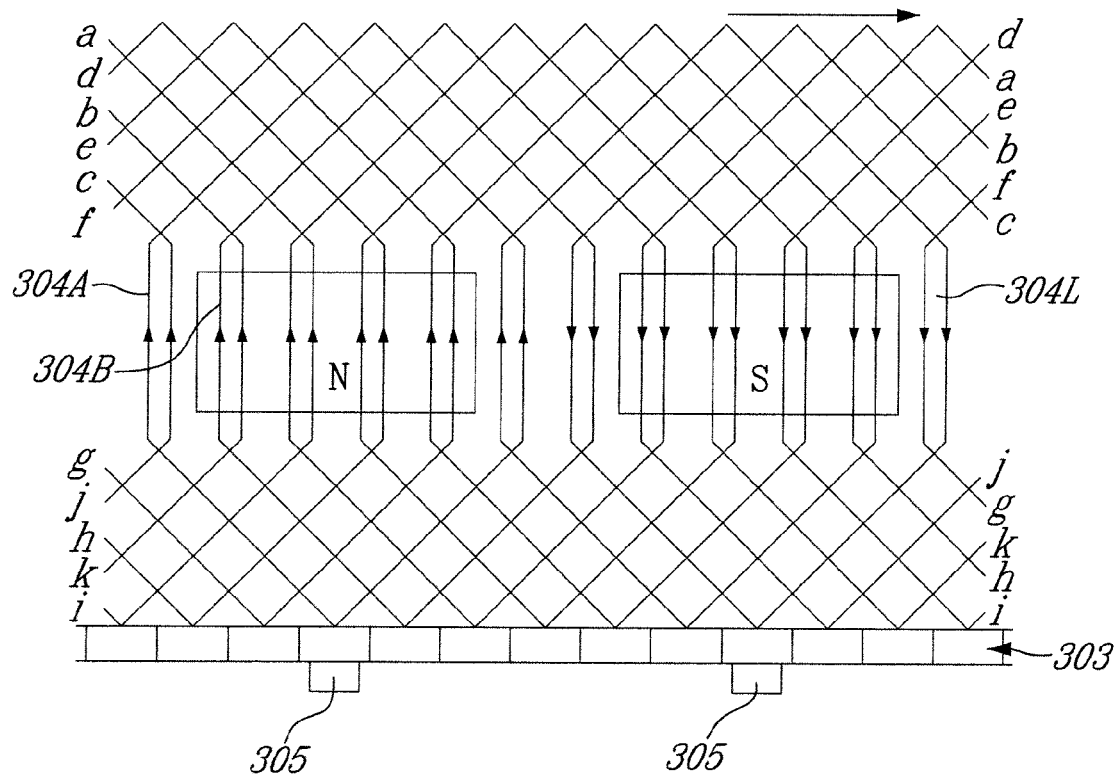
FIG. 9 is a schema illustrating the electrical connections between the wires of FIG. 8.

While FIG. 8 illustrates a shaft having twenty four wires 304A,B . . . L embedded in twelve recesses 302, it should be understood that the number of recesses and wires may vary. Similarly, while the electrical connections illustrated in FIG. 9 are configured to form two poles, it should be understood that other electrical connections are possible. For example, the electrical connections may be configured to form four poles, with the shaft including for example twenty four recesses.

Figure 10:
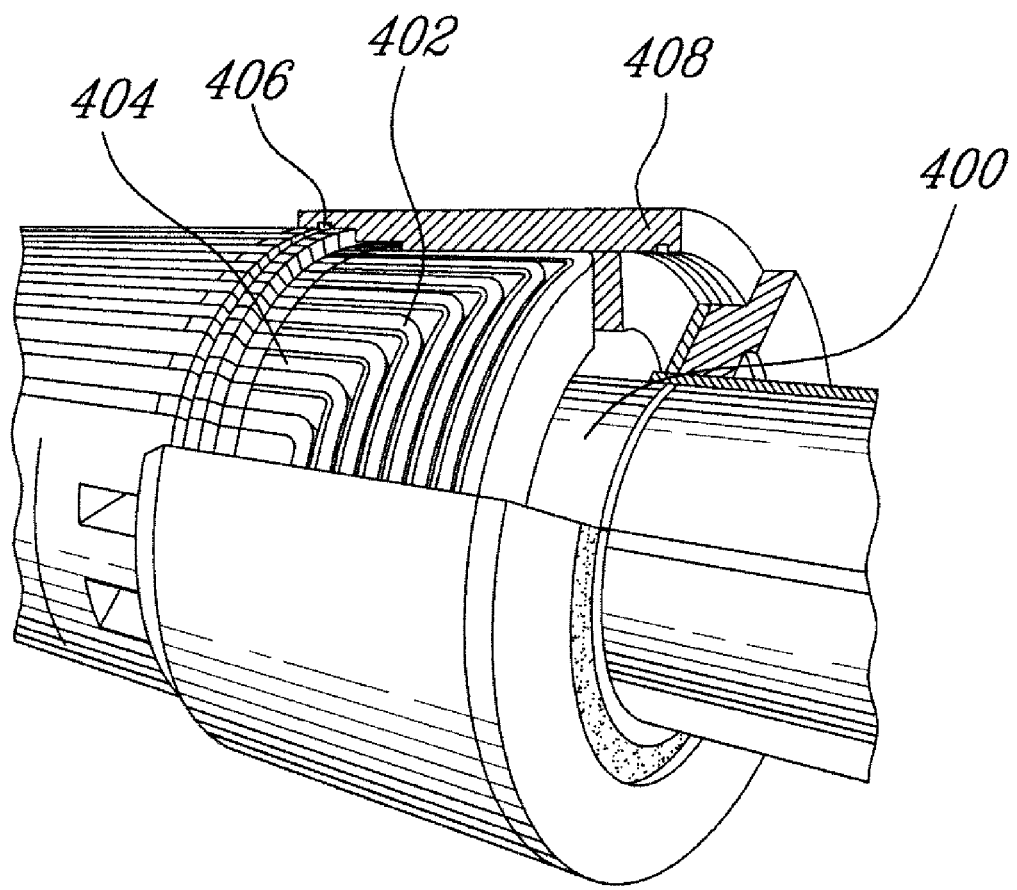
FIG. 10 is a partial perspective view of a rotor of the electrical assembly comprising wires on an outer surface of the shaft, in accordance with an alternate embodiment.

It should also be understood that the shaft supporting the rotor of the electrical assembly may be free from any recess and the wires 304 may be attached to the outer surface. In this case, flat rectangular wires can be used. FIG. 10 illustrates another embodiment of a rotor embedded in a shaft, where flat wires 402 are disposed on an outer surface 400 of the shaft (e.g. high pressure shaft 244, 244', tower shaft 280), bent at the ends of the shaft and coiled to form the electromagnet, and spaced apart by fitted blocks 404. A locking key 406 retains the ends of the flat wires 402 and a retaining ring 408 surrounds the end of the electromagnet.

In a particular embodiment, the electrical assembly 22, 242, 262, 288 allows for the accessory gear box typically provided in a gas turbine engine to be omitted, and as such can allow for reducing the complexity and weight of the engine. Elimination of the accessory gear box can also improve the maintainability and increase engine life through the reduction of elements present in the engine.

Optionally, a "mini" accessory gear box can be provided, for example mounted on the tower shaft 280, to drive other accessories.

In a particular embodiment, both the electrical assembly 22, 242, 262 on the main shaft and the electrical assembly 288 on the tower shaft are provided in the same engine. In such a configuration, one electrical assembly can act as a back up for the other, and/or one can be used as a generator while the other is used as a motor.

In one embodiment, a gas turbine engine can be retrofitted with a generator/motor electrical assembly described above. Any existing shaft present in an existing gas turbine engine can be used as part of the rotor of the electrical assembly described above without requiring additional gear mechanism for connecting the generator/starter to the shaft.

The above description is meant to be exemplary only, and one skilled in the art will recognize that changes may be made to the embodiments described without departing from the scope of the invention disclosed. For example, the stator may comprise electromagnet or a combination of permanent magnets and electromagnets. The electrical assembly can be provided on other types of gas turbine engines such as turboprop engines, turboshaft helicopter engines, as well as on industrial and marine gas turbine engines, and gas turbine engines of various sizes. Still other modifications which fall within the scope of the present invention will be apparent to those skilled in the art, in light of a review of this disclosure, and such modifications are intended to fall within the appended claims.

The invention claimed is:

1. A gas turbine engine having a compressor section and a turbine section, comprising:
    a first shaft being one of a main shaft having at least one turbine rotor of the turbine section concentrically directly mounted thereto and a tower shaft directly driven by the main shaft and extending generally radially therefrom;
    an electrical machine assembly having a rotor and a stator, the rotor coaxially secured to the first shaft for rotation therewith, the rotor including at least one field winding for conducting electrical current therein, the stator having a plurality of permanent magnets disposed adjacent an outer periphery of the rotor, the rotor and stator cooperating to provide in use a magnetic circuit surrounding the at least one winding for conducting magnetic flux around the at least one winding; and
    an electrical connection between the rotor winding and at least one of a power source and a power distribution system.

2. The gas turbine engine as claimed in claim 1, wherein the rotor is secured to a circumferential surface of the first shaft.

3. The gas turbine engine as claimed in claim 1, wherein the rotor is secured to an end surface of the first shaft.

4. The gas turbine engine as claimed in claim 1, wherein the field winding comprises at least one electrical conductive wire to define at least one coil.

5. The gas turbine as claimed in claim 1, wherein at least one support portion mounts the rotor to the first shaft.

6. The gas turbine as claimed in claim 5, wherein the support portion includes a plurality of radially projecting supports.

7. The gas turbine engine as claimed in claim 5, wherein the support portion includes metallic strips and electrically insulating strips, one of the electrically insulating strips being positioned between each two following ones of the metallic strips.

8. The gas turbine engine as claimed in claim 5, wherein the field winding comprises a plurality of conductive wires electrically connected to form at least two coils, the conductive wires being embedded in slots of the support portion.

9. The gas turbine engine as claimed in claim 1, wherein the main shaft is a hollow high pressure shaft having a low pressure shaft extending therein and rotating independently therefrom, the support portion being secured to the high pressure shaft.

10. A gas turbine engine comprising a first shaft being one of a main shaft having at least one turbine rotor directly and concentrically mounted thereto and a tower shaft directly driven by the main shaft and extending generally radially therefrom, and an electrical assembly operable as at least one of an electric motor and a generator, the electrical assembly including an electromagnetic rotor, the electromagnetic rotor being formed in part by a portion of the first shaft.

11. The gas turbine engine as claimed in claim 10, wherein the portion of the first shaft comprises a support portion secured to an outer circumferential surface of a remainder of the first shaft.

12. The gas turbine engine as claimed in claim 10, wherein the portion of the first shaft comprises a support portion secured to an end surface of a remainder of the first shaft.

13. The gas turbine engine as claimed in claim 10, wherein the portion of the first shaft is integral with a remainder of the first shaft.

14. The gas turbine engine as claimed in claim 10, wherein the portion of the first shaft includes a support portion comprising a plurality of grooves defined in an outer surface thereof, and the rotor includes conductive wires embedded in the grooves to define at least two coils.

15. The gas turbine as claimed in claim 10, wherein the portion of the first shaft includes a support portion comprising a plurality of radially projecting supports around which conductive wire is wound to form a plurality of coils.

16. The gas turbine engine as claimed in claim 10, wherein the first shaft is the main shaft, the main shaft being a hollow high pressure shaft having a low pressure shaft extending therein coaxially therewith, the hollow high pressure shaft and the low pressure shaft being drivingly connected to at least one respective turbine rotor of the gas turbine engine.

* * * * *